Jan. 1, 1935.  E. G. BAILEY  1,986,667
FURNACE
Filed Dec. 22, 1930   3 Sheets-Sheet 1

INVENTOR
ERVIN G. BAILEY

Jan. 1, 1935.  E. G. BAILEY  1,986,667
FURNACE
Filed Dec. 22. 1930   3 Sheets-Sheet 2

INVENTOR
ERVIN G. BAILEY
BY
ATTORNEY

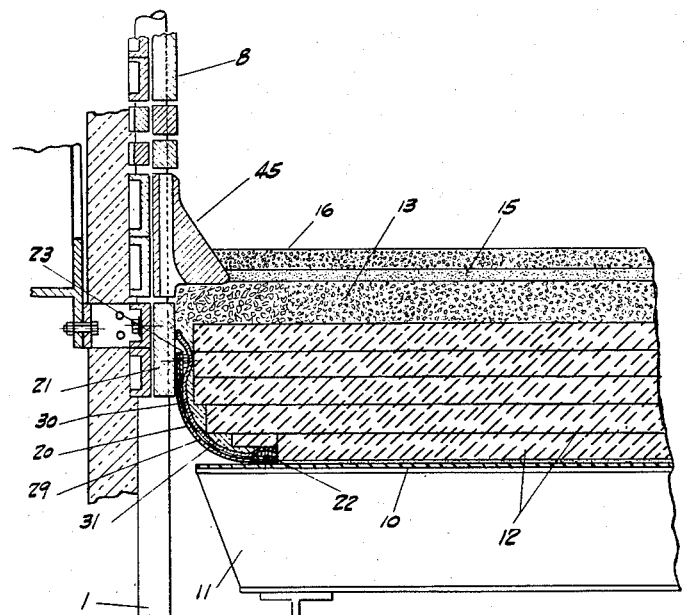

Patented Jan. 1, 1935

1,986,667

UNITED STATES PATENT OFFICE 1,986,667

FURNACE

Ervin G. Bailey, Easton, Pa., assignor to Fuller Lehigh Company, Fullerton, Pa., a corporation of Delaware Application December 22, 1930, Serial No. 503,875

13 Claims. (Cl. 122—235)

This invention relates to a boiler furnace that is provided with a floor which may be air cooled and will permit slag from the fuel to collect upon the floor and be tapped out at intervals in a molten condition.

Figure 1:
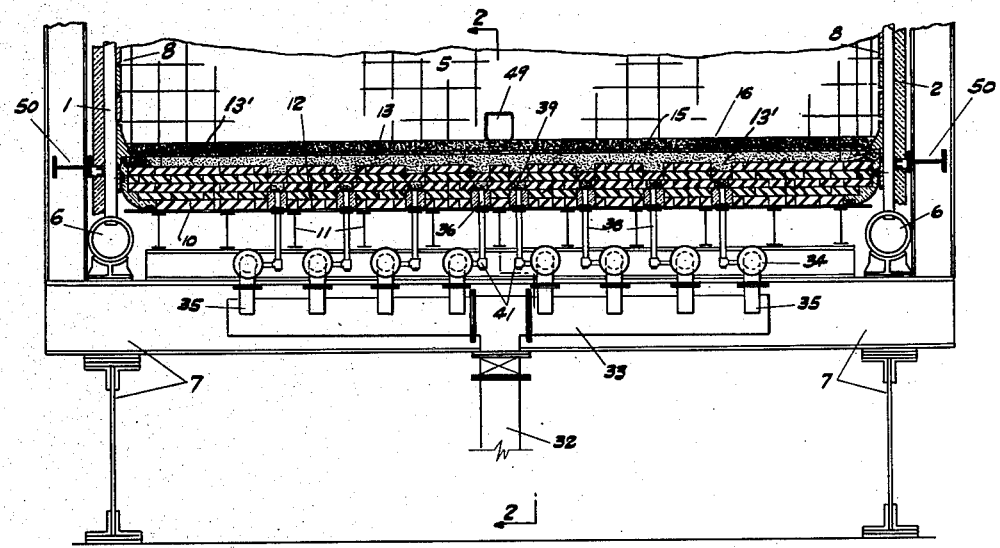
Figure 2:
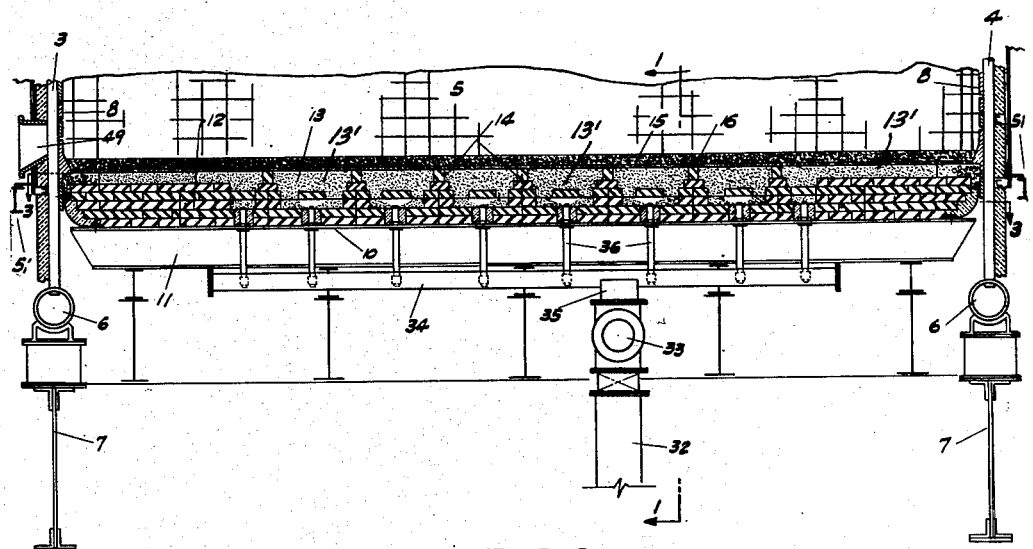
Figure 3:
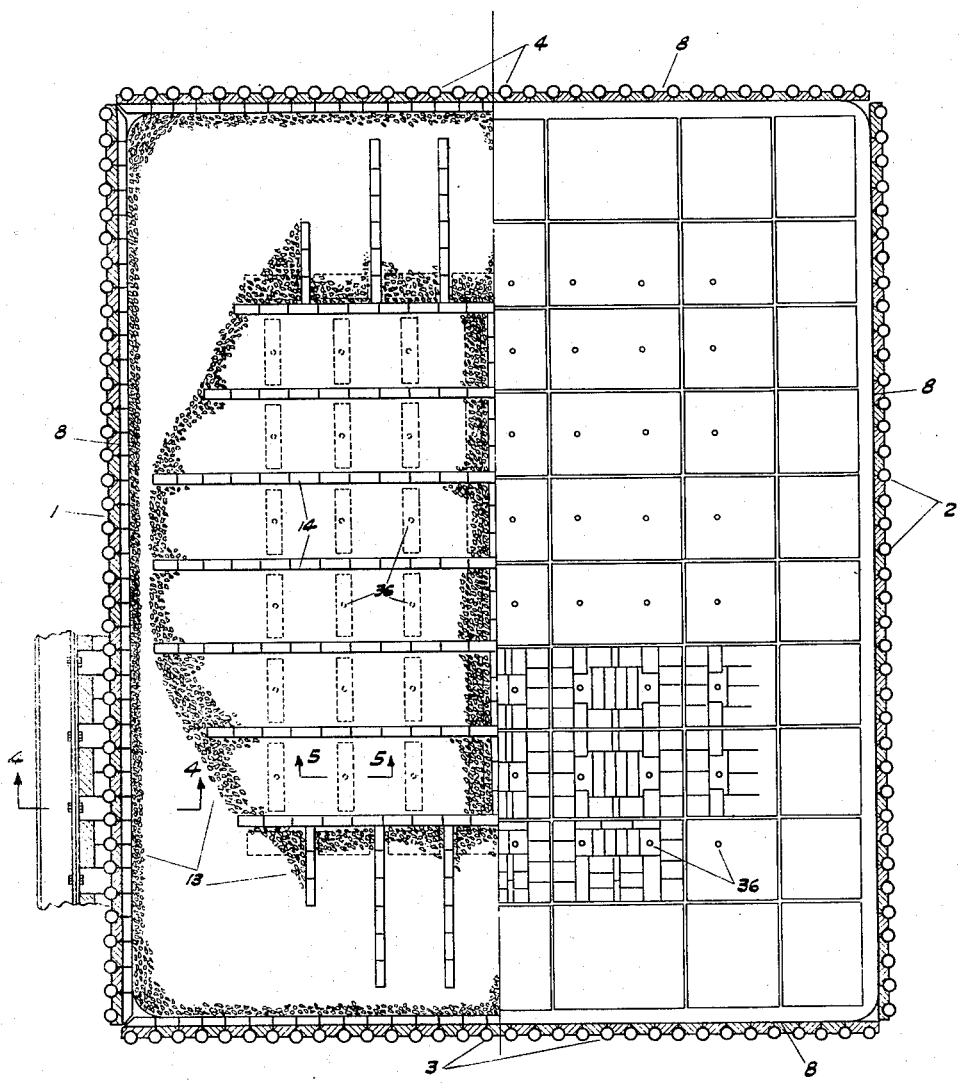

The invention will be understood from the description in connection with the accompanying drawings, in which Fig. 1 is a vertical section through the lower portion of a furnace taken along the line 1—1 of Fig. 2, illustrating an embodiment of the invention; Fig. 2 is a vertical section at right angles to Fig. 1 taken along the line 2—2 of Fig. 1; Fig. 3 is a section taken along the line 3—3 of Fig. 2; Fig. 4 is a vertical section on an enlarged scale at the edge of the floor, taken along the line 4—4 of Fig. 3; Fig. 5 is a section along the line 5—5 of Fig. 3, showing one of the air pipes and a part of the furnace floor; Fig. 6 is a side view and Fig. 7 is an edge view of one of the tile for the furnace; Fig. 8 is a section along the line 8—8 of Fig. 9, and Fig. 9 is a plan view at the corner of the floor with parts removed.

In the drawings, reference characters 1, 2, 3 and 4 indicate rows of upwardly extending water tubes along the respective sides of the furnace 5. The lower ends of the tubes 1, 2, 3 and 4 extend into lower headers 6 which may be supplied with water from the boiler or other source (not shown). The headers 6 may be supported upon supports 7. The tubes 1 to 4 are lined with tile or Bailey blocks 8 in the well-known way.

The floor of the furnace comprises a lower plate 10 preferably of metal, which may be in sections, that rests upon supports 11 in the form of I-beams. A base 12 of refractory tile or brick is provided on the plate 10 and preferably comprises a plurality of layers. A layer 13 of granular refractory material is provided above the tile or brick 12. This granular refractory material may be, for example, magnesite, chrome ore, granite, broken fire brick or the like. The layer 13 is divided by refractory tile barriers or partitions 14 in such a manner that the air which is introduced into the layer of granular refractory material is guided to the edges of the floor preferably in parallel pairs without danger of short-circuiting about any particular area.

A sheet or layer 15 of refractory material that should be air-tight is placed upon the layer 13 and barriers 14. The layer 15 may be made of moldable refractory material or it may be made of tile with their edges cemented together to prevent air leakage. A layer 16 of refractory material which may have a magnesite base or other refractory material that is resistant to the action of the slag from the furnace, is placed upon the layer 15. When magnesite, for example, is used, such materials as water glass or iron sulphide may be mixed with it to assist in sintering the same in place to make a strong compact mass upon which the slag falls.

Metal sealing plates 20 (Fig. 4) extend from the edges of the plate 10 to tile 21 that are connected to the wall tubes. The plates 20 are curved with one edge bolted to the plate 10 and the other to the tile, as indicated by the bolts 22 and 23. Slots may be provided in the upper edges of the plates 20 for the bolts 23 to provide relative up and down movement between the stationary floor 10 and the side walls which may move up and down by expansion and contraction. Seal plates 25 (Figs. 8 and 9) are provided at the corners and are bolted to the bottom plate 10 and tile on the wall tubes, as indicated at 26 and 27. The plates 25 may be corrugated or provided with flutes 28 to provide for compression and enable the plates to take care of horizontal movement of the walls relative to the furnace floor. The plates 20 and 25 are protected from oxidation that would be caused by the heat of the furnace by coating the upper sides of the same with plastic bituminous material 29 upon which a sheet of insulating material 30 and a layer of moldable refractory material 31 may be placed.

An air supply pipe 32 from any convenient source of compressed air leads to a manifold 33 to which cross air pipes 34 are connected by the connections 35. A row 36 of small air pipes extends from each cross pipe 34 through holes 37 in the plate 10 into the granular refractory material 13 in the floor. The pipes 36 are shown most clearly in Fig. 5 passing through the plate 10. The nozzles 38 of the pipes 36 above the plate 10 are provided with orifices 39 and are surrounded with plastic refractory material 40, which, together with the way the pipes 36 are connected to the plate 10, prevent air from leaking through the plate 10. The pipes 36 are provided with T's 41 (Fig. 1), so that the nozzles 38 and orifices 39 can be cleaned by passing a cleaner or rod through the T's 41 if they get clogged up.

The tile 12 are arranged so that an air expansion space is provided around each orifice 39 and paths or passages 13' are provided from these nozzles to the side walls of the furnace, which passages are filled with the granular refractory material 13.

The air supplied through the pipe 32 enters the refractory material 13 and passes laterally therethrough under the plate 15 to the respective side walls of the furnace.

A row of special tile 45 is provided along each edge of the furnace floor near the top of the same above the granular layer 13. Each tile 45 is provided with rounded portions 46 to contact with the furnace wall tubes and the tile are bolted to these tubes to keep the tile in place. Each tile is provided with an extending sloping portion 47 that contacts with the layers 15 and 16 and a port 48 extends upwardly through each tile 45 from the granular layer 13 into the combustion space of the furnace 5. The air passing through the refractory material 13 and thence through the ports 48 into the furnace maintains the top layer 16 of the furnace floor at such a temperature that molten slag falling on this layer will congeal and prevent penetration of slag through the floor material. When a sufficiently thick layer of slag has congealed on the floor, the remainder or upper portion of the slag will be maintained in a molten condition and may be tapped out through the tap hole 49 in a wall of the furnace.

Buckstays 50 and 51 are located outside of the furnace wall structure a short distance below the level of the top surface of the furnace floor to prevent the walls from being thrust outwardly in case some molten slag penetrates through the upper layer 16 of refractory material causing progressive growth and expansion which might otherwise cause the furnace walls to be pushed out.

I claim:

1. In a furnace, a floor including a layer of particles of refractory material spaced to provide air passages therebetween, substantially air-tight layers of material above and below said refractory material, and means directing air through the said passages to said furnace.

2. In a furnace, a floor including a layer of particles of refractory material spaced to provide air passages therebetween, substantially air-tight layers of material above and below said refractory material extending to the side walls of said furnace, and means directing air through the said passages to said furnace.

3. In a furnace, a floor including a layer of particles of refractory material spaced to provide air passages therebetween, substantially air-tight layers of material above and below said refractory material, tile at the edge of said floor, each tile having a port opening communicating with said passages, water tubes to which said tile are connected, and means directing air through the said passages to said furnace.

4. In combination in a furnace, side walls, a floor, including particles of refractory material spaced to provide air passages therebetween, means for introducing air into said passages, means for directing air through said passages toward a side wall, and means forming air outlets from said passages to said furnace.

5. In combination in a furnace, side walls, a floor including particles of refractory material spaced to provide air passages therebetween, means for introducing air into said passages, means directing the air in a horizontal direction toward a side wall, and means forming an air outlet from said passages to said furnace.

6. In a furnace, a floor including substantially air-tight layers of material, a layer of particles of refractory material between said air-tight layers, said refractory particles being spaced to provide air passages therebetween, tile at the edge of the floor, each tile having a port opening communicating with said passages and the combustion space, and means directing air through said passages, to said furnace.

7. In combination in a furnace, a wall including water cooling tubes, a floor including a layer of particles of refractory material spaced to provide air passages therebetween and supported on a substantially air-tight bottom connected to said tubes below the top surface of the floor, means for introducing air into said passages, means for directing the air toward the tubes, and means adjacent to said tubes forming an air outlet from said passages to said furnace.

8. In a furnace, a floor including a layer of particles of refractory material spaced to provide air passages therebetween, substantially air-tight layers of material above and below said refractory material, tile at the edge of said floor, said tile having port openings communicating with said passages, and means directing air through said passages to said furnace.

9. In combination in a furnace burning slag forming fuel, upwardly extending water cooled walls including spaced tubes and closure members for the spaces, a horizontally extending substantially air-tight metallic bottom, air seal connections between said walls and said bottom, a layer of refractory material spaced from said bottom and adapted to sustain a layer of molten slag, and means directing air between said refractory layer and said metallic bottom whereby overheating of the bottom is avoided.

10. The method of operating a slag tap furnace having a floor including a refractory layer sustaining a molten slag layer which comprises passing a current of cooling air in a stream of predetermined dimensions beneath and in heat transfer relation with the layer in a volume adequate to solidify the slag layer only to a floor protective layer depth while thus adding heat enough to the air to enhance combustion of slag forming fuel in the furnace, and then passing the air thus heated as aforesaid into the furnace combustion zone.

11. In a furnace, a floor including top and bottom layers of at least substantially air-tight material and an intermediate layer of particles of refractory material so formed as to provide air passages therebetween, and means providing for a positive flow of air through said passages.

12. In a furnace, a floor including top and bottom layers of at least substantially air-tight material and an intermediate layer of loose granular material providing air passages between grains, and means providing for the positive flow of air through the air passages provided by said layer of loose granular material and into the furnace for supporting combustion.

13. In a furnace, means defining a combustion chamber for the burning of a slag forming fuel, means providing a bottom for the furnace for supporting a molten pool of slag, said last named means comprising an upper layer of at least substantially air-tight refractory material supporting the slag, a bottom layer of at least substantially air tight material, and an intermediate layer of loose granular material providing air passages between grains, and means providing for the positive flow of cooling air through the passages provided by said layer of loose granular material.

ERVIN G. BAILEY.